April 7, 1959

F. LA MONICA 2,880,958

TRACER CONTROLLED HYDRAULIC VALVE

Filed Jan. 15, 1954

INVENTOR.
FRANK LaMONICA.
BY
Louis V. Lucia
ATTORNEY.

2,880,958

TRACER CONTROLLED HYDRAULIC VALVE

Frank La Monica, Unionville, Conn., assignor to The United Tool & Die Company, Elmwood, Conn., a corporation of Connecticut Application January 15, 1954, Serial No. 404,173

6 Claims. (Cl. 251—3)

This invention relates to a tracer controlled hydraulic valve and more particularly to such a valve for controlling the operation of hydraulically operated duplicating mechanisms such as commonly used on lathes and the like.

It is an object of this invention to provide such a valve which will be operated when its tracer member is moved in any lateral direction while following the contour of a template or the like.

A further object of the invention is to provide a mechanism which will respond accurately to lateral movement of the tracer member in any direction and transmit the said lateral movement into a longitudinal movement of a valve member in a direction perpendicular to the plane of said lateral movement.

A still further object of this invention is to provide a mechanism for such a valve which is extremely sensitive to the movement of the tracer member and highly accurate in its operation.

Further objects and advantages of the invention will be more clearly understood from the following description and the accompanying drawings in which.

Figure 1:
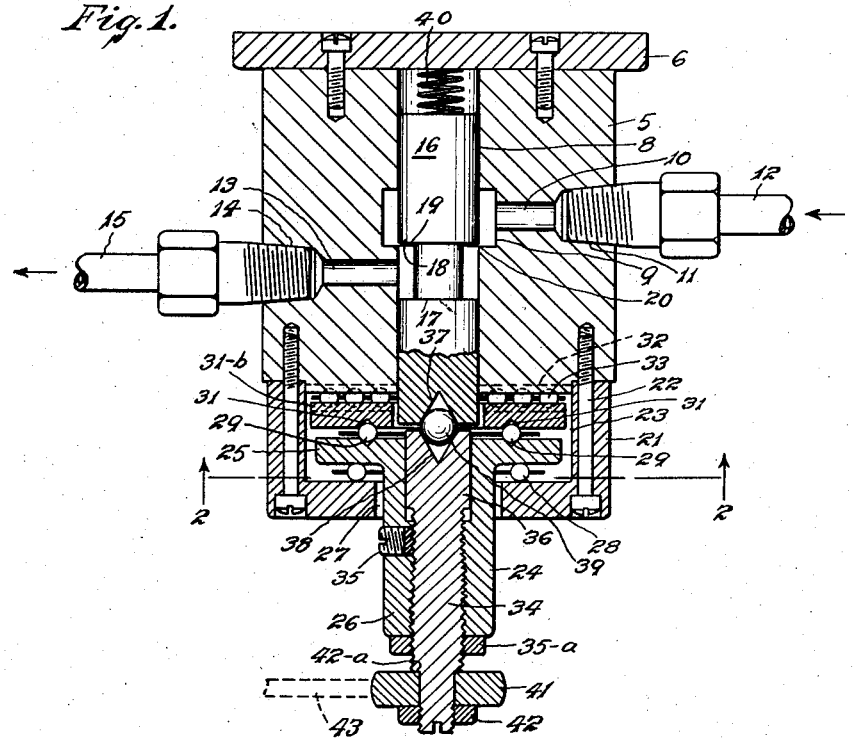
Fig. 1 is a sectional plan view of a valve embodying my present invention.
Figure 2:
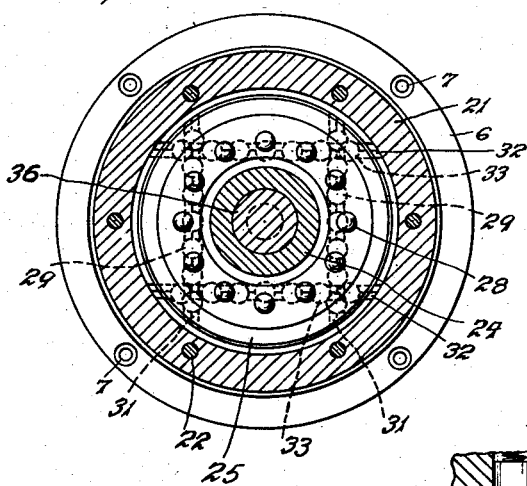
Fig. 2 is a sectional view thereof on line 2—2 of Fig 1.
Figure 3:
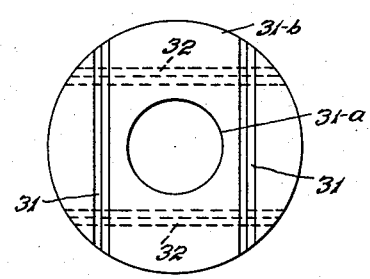
Fig. 3 is a side view of the bearing plate used in said valve.

In the embodiment of the invention which is illustrated in the drawings, the numeral 5 denotes the housing of my improved valve which is preferably mounted upon an end plate 6 that provides a base for said valve and has screw holes 7 for mounting the valve upon a suitable support in machines such as grinders, lathes and the like.

The said housing has a bore 8 therein with an annular groove 9 in the wall thereof and a communicating passage 10 which extends to a threaded recess 11 to which is connected an inlet pipe 12. An outlet passage 13 communicates the bore with a threaded recess 14 to which is connected an outlet pipe 15.

A valve plunger 16 is slidably contained within the bore 8 and has a circumferential groove 17 therein which is normally in register with the passage 13 and forms an annular shoulder 18. This shoulder provides an annular circumferential valve edge 19 which cooperates with the annular edge 20, that is formed by the annular groove 9, to control the flow of hydraulic fluid from the said annular groove 9 into the circumferential groove 17.

The operating mechanism for said valve includes a cap 21 that is secured to the front of the body 5, by means of screws 22, and has a recess 23 therein which contains the operating mechanism. A tracer carrier 24 has a flange portion 25 and a hub portion 26 which extends outwardly therefrom through a central opening 27 in the cap 21 that is larger than the said hub portion to permit substantial lateral movement of the said tracer carrier relatively to the body 5.

The said carrier is supported for lateral movement in all directions by ball bearings which include an annular row of balls 28 that is contained between the bottom surface of the flange portion 25 and the bottom of the recess 23.

The said ball bearings further include straight parallel rows of balls 29—29 which are contained in pairs of opposed longitudinal parallel grooves 31—31 in the upper surface of the said flange portion 25 and the bottom surface of a bearing plate 31-b that is provided between the said flange portion and the bottom end surface of the housing 5. Also included in said ball bearings are straight parallel rows of balls 33—33 which are contained in opposed pairs of parallel longitudinal grooves 32—32, in the said bottom surface of the housing 5 and the top surface of the plate 31-b, and extend crosswise to the grooves 31—31. Suitable retainers are provided, as shown, for retaining the said rows of balls 28, 29—29 and 33—33 in their respective positions.

The carrier 24 carries an elongated tracer supporting stem 34 which extends longitudinally through an axial bore in the hub 26 and is threaded to the wall of said hub to provide adjustment for the purpose to be hereinafter described. A set screw 35 extends through the wall of the hub for clamping the stem 34 in adjusted position to prevent any lateral vibration of the stem relatively to the carrier 24 and a check nut 35-a is threaded to the stem and engages the end of the hub 26 to secure the said stem in adjusted position. The inner end of the said stem 34 has an enlarged portion 36 which fits snugly within an unthreaded portion of the bore in the hub 26 to prevent lateral movement of the stem relatively to said member.

The adjacent ends of the plunger 16 and stem 34 are provided with co-axial and opposed conical recesses 37 and 38, respectively, and a thrust ball 39 is contained in said recesses between said plunger and stem. The walls of the said recesses are relatively inclined at an included angle of less than 90 degrees, preferably 60 degress, so as to transmit longitudinal movement to the plunger 16 which is greater than the relative transverse movement of the tracer members 26 that is converted into said longitudinal movement.

The plunger 16 is retained in its normal position against the ball 39 by means of a suitable spring 40 that is disposed between the end of the plunger and the base plate 6 and the forward end of said plunger extends through an axial hole 31-a, in the plate 31-b, which is larger than the plunger to permit lateral movement of the said plate relatively to the plunger.

In the embodiment shown, a tracer member 41 is mounted upon the forward end of the stem 34 which projects from the member 24. This tracer member is preferably secured to the stem by means of a nut 42 which is threaded to a reduced portion of the stem and secures the tracer member against an annular shoulder 42-a.

When lateral movement is applied to the tracer member 41 in any direction, by such means as a template, indicated at 43, the carrier 24 will also be correspondingly moved upon the balls 28. This will cause corresponding movement of the balls 29 and 33 in their grooves 31—31 and 32—32, respectively, which are disposed crosswise to each other. Said movement of the carrier 24 will force the ball 39 outwardly of the recesses 37 and 38 and thereby cause longitudinal movement of the plunger 16, against the tension of the spring 40, which will control the flow of fluid through said valve in accordance with the lateral movement of the tracer member 41 by said template.

It will also be understood, from the drawings and the above description, that the parallel opposed grooves 32—32 in the opposed faces of the housing 5 and the bearing plate 31-b will prevent rotation of said plate through the medium of the balls 33 which are contained in said grooves. The opposed grooves 31—31 in the opposed faces of the plate 31-b and the flange 25 will prevent rotation of the bearing member 26 through the medium of the balls 29. Therefore, the said bearing member 26 may be moved laterally in any direction but it will not be permitted to rotate and this will allow the use of a tracer member having an offset extension for contacting a template such as 43.

Any undesirable movement of the carrier member 26, which may be due to looseness in the ball bearings provided by my improved mechanism, may be taken up by grinding the inner surface of the cap 21 which contacts the housing 5.

The plunger 16 may be adjusted so as to provide the proper amount of clearance between the edges 19 and 20, by adjusting the stem 34 lengthwise in the carrier 26, by means of the screwthread between the said stem and said member, so that a desired flow of fluid may be maintained through said valve and the said flow will then be varied by longitudinal movement of the plunger corresponding with any lateral movement of the member 26 which may be caused by variations in the contour of the template being traced by the tracer member 41.

Due to the fact that the recesses 37 and 38 are conical to an included angle which is less than 90 degrees, the longitudinal movement of the plunger 16 will be greater than the lateral movement of the carrier 26 and this will permit the control of a correspondingly greater amount of circulation of the hydraulic fluid through the said valve and thereby correspondingly increase the sensitivity of the valve to the tracer member as well as the efficiency of the said valve.

Figure 4:
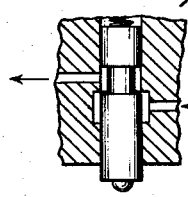
Fig. 4 is a reduced sectional view of a modified form of valve which may be used with my present invention.

As shown in Fig. 4, the construction of the valve may be modified so that inward movement of the plunger will act to close the valve instead of opening it as in the form shown in Fig. 1.

I claim:

1. In a valve mechanism, the combination of a housing having a longitudinal bore therein, a valve plunger slidable in said bore and projecting from the housing, the front of the housing having a surface transverse to said plunger, spaced and parallel longitudinal grooves in said surface located at opposite sides of the projecting portion of said plunger, a bearing plate having grooves in one side thereof opposed to the grooves in said transverse surface, balls contained within opposed pairs of said grooves, the said bearing plate having an axial opening therethrough of a diameter larger than the projecting portion of the plunger and into which said portion extends, spaced and parallel longitudinal grooves in the opposite side of said bearing plate extending crosswise to the first-mentioned grooves in said plate, a tracer member having a portion adjacent the projecting portion of the plunger and longitudinal grooves opposed to the said grooves in said opposite side of the bearing plate, balls in said grooves between the plate and tracer member contained in pairs of said opposed grooves, a cap on said housing having an opening therein of a diameter larger than the tracer member and through which said tracer member extends, a series of balls between said tracer member and said cap, opposed conical recesses in adjacent portions of the tracer member and plunger, a ball within said conical recesses for transmitting lateral movement of the tracer member into longitudinal movement of said plunger, and a spring yieldingly forcing said plunger into contact with said ball and said ball into contact with the said tracer member.

2. In a valve mechanism, the combination of a housing having a longitudinal bore therein opening at an end surface of said housing, a valve plunger slidable in said bore and projecting therefrom beyond said end surface, longitudinal and spaced parallel grooves in said end surface located at opposite sides of said projecting portion of the plunger, a bearing plate having an axial opening therein larger than the projecting portion of said plunger and into which the said portion extends, longitudinal and spaced grooves in one side of said plate opposed to the grooves in the end surface of the housing, balls contained in opposed pairs of said grooves between the end surface and bearing plate, spaced longitudinal and parallel grooves in the opposite side of the plate extending crosswise to the first-mentioned grooves in said plate, a tracer member normally disposed upon the axis of the plunger and having a portion adjacent the projecting portion of the said plunger, the said tracer member having a flange portion adjacent to the said opposite side of the bearing plate, longitudinal grooves in said flange portion opposed to the grooves in said opposite side of the bearing plate, balls within opposed pairs of said grooves between the bearing plate and flange portions, a cap member mounted upon said end surface of the housing and having a wall adjacent to said bearing plate and extending transversely to the axis of said plunger and tracer member, the said wall having an opening therein larger than the tracer member and through which said tracer member extends, an annular row of balls between the said flange portion and wall, the adjacent portions of said tracer member and plunger having opposed conical recesses therein, a ball contained within said conical recesses, and spring means normally urging said plunger into contact with said ball and said ball into contact with the tracer member.

3. In a valve mechanism, the combination set forth in claim 1 wherein the walls of the conical recesses are at an included angle of less than ninety degrees to thereby transmit lateral movement of the tracer member into greater longitudinal movement of the valve plunger.

4. In a control valve, the combination of a housing having an end surface and an axial bore opening at said end surface, a valve plunger longitudinally slidable in said bore and having an end portion thereof projecting from said bore outwardly of the end surface, a ring-shaped bearing plate having a central opening larger than the projecting portion of the plunger and through which the said projecting portion extends, the said plate being located around said projecting portion and adjacent to the end surface of the housing, a tracer carrier member having a disc-shaped portion adjacent to the said bearing plate and a hub portion perpendicular to the said disc-shaped portion, a cap member mounted upon the end surface of the housing and having an annular wall surrounding the said bearing plate and disc-shaped portion of the tracer carrier member, the said cap having a wall transverse to its annular wall and adjacent the said disc-shaped portion, the said transverse wall having an opening therein larger than the said hub portion and through which the said hub portion extends, a pair of spaced parallel longitudinal and opposed grooves in the said end surface of the housing and the adjacent surface of the bearing plate located at opposite sides of the plunger, balls contained in said grooves rendering the bearing plate laterally movable in one direction relatively to the housing, opposed parallel longitudinal grooves in the said disc-shaped portion of the tracer carrier and the adjacent surface of the bearing plate disposed at opposite sides of the plunger and crosswise to the said opposed grooves in the bearing plate and the end surface of the housing, balls within said opposed grooves between the bearing plate and disc-shaped portion of the tracer carrier member rendering the said carrier member laterally movable relatively to the bearing plate in a direction crosswise to the movement of the bearing plate relatively to the housing, and an annular row of balls between the said disc-shaped portion and the transverse wall of the cover member, the said balls between the carrier member and the bearing plate and the bearing plate and end surface rendering the said tracer carrier laterally movable in any direction and preventing rotational movement of said tracer carrier relatively to the housing, and means between the tracer carrier member and the valve plunger for transmitting the lateral movement of said carrier member into longitudinal movement of the valve plunger.

5. In a valve mechanism, the combination of a housing having a longitudinal bore therein, a valve plunger slidable in said bore, a tracer carrier mounted for lateral movement in any direction relative to said housing, bearing means for said tracer carrier including a bearing plate between said tracer carrier and housing, a parallel pair of opposed longitudinal grooves in said plate and housing, a series of balls within said opposed grooves, a parallel pair of opposed longitudinal grooves in said plate and carrier member extending crosswise to the opposed grooves in the housing and plate, a series of balls in said latter grooves, means preventing relative axial displacement of the said bearing plate and tracer carrier, and means between said carrier member and plunger converting lateral movement of the carrier member into longitudinal movement of the plunger.

6. In a control valve mechanism, the combination of a housing having an end surface and an axial bore opening at said end surface, a valve plunger slidable in said bore, a tracer carrier member having a flange portion parallel to the said end surface and a hub portion extending perpendicularly from the flange portion, bearing means supporting said carrier member upon said housing and rendering said member laterally movable in any direction on a single plane, the said carrier member having a bore extending longitudinally through the hub portion thereof and coaxial with the said plunger, a portion of the said bore in the carrier member being threaded and a different portion adjacent to the plunger and unthreaded, a tracer support in said bore threaded to the threaded portion thereof and having an unthreaded portion fitting snugly in the unthreaded portion of the bore, a tracer member on said tracer support, means extending through the wall of said hub portion and engaging the said tracer support for preventing vibration of the said tracer support relatively to the carrier member, opposed conical recesses in the adjacent end portions of said plunger and tracer support, a ball contained within said conical recesses between said adjacent end portions, and spring means urging said plunger into contact with said ball and said ball into contact with said carrier member.

References Cited in the file of this patent

UNITED STATES PATENTS

| | | |
|---|---|---|
| 2,130,109 | Turchan | Sept. 13, 1938 |
| 2,331,817 | Turchan | Oct. 12, 1943 |
| 2,332,532 | Roehm | Oct. 26, 1943 |
| 2,373,332 | O'Neill | Apr. 10, 1945 |
| 2,434,853 | Johnson | Jan. 20, 1948 |
| 2,586,654 | Hoelscher | Feb. 19, 1952 |
| 2,622,616 | Humes | Dec. 23, 1952 |